June 17, 1924.
W. G. WISLICEN
1,497,705
AUTOMOBILE SEAT
Filed Oct. 25, 1920
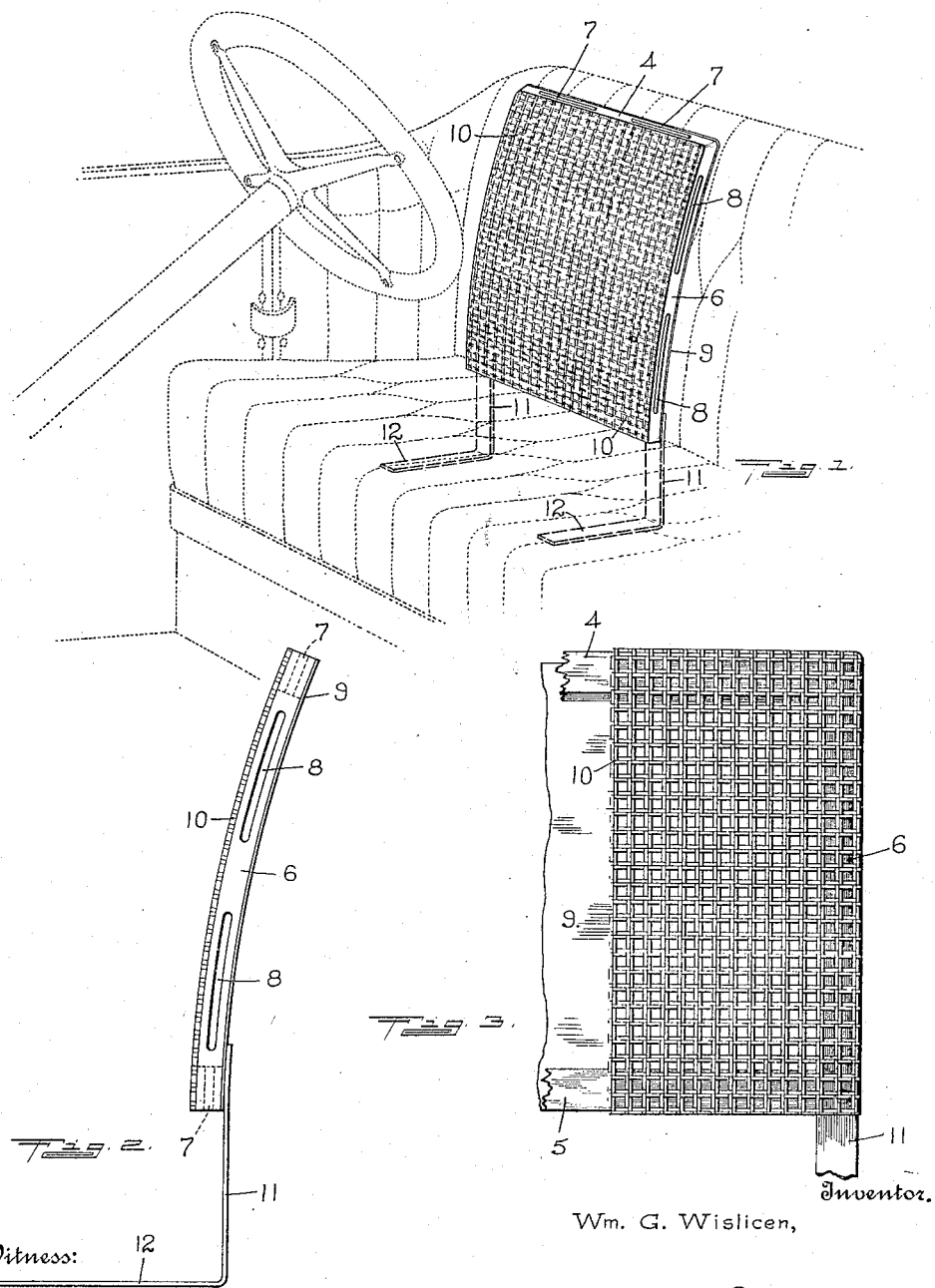
Wm. G. Wislicen,
Inventor.
Witness:
A. W. Jamieson.
By David O. Barnell.
Attorney Patented June 17, 1924.

1,497,705

UNITED STATES PATENT OFFICE.

WILLIAM G. WISLICEN, OF FREMONT, NEBRASKA.

AUTOMOBILE SEAT.

Application filed October 25, 1920. Serial No. 419,282.

*To all whom it may concern:*

Be it known that I, WILLIAM G. WISLICEN, a citizen of the United States, and a resident of Fremont, in the county of Dodge and State of Nebraska, have invented certain new and useful Improvements in Automobile Seats, of which the following is a specification.

My invention relates to automobile seats, and it is the object thereof to provide a detachable ventilating back for such seats, particularly adapted for use by the driver of a motor-vehicle during warm weather, to avoid discomfort and soiling of clothing by perspiration upon the back, such as occurs when the back of the driver rests directly upon the ordinary upholstered back-cushions of the seat. My invention may, of course, be applied to any seat of the vehicle, and provides a simple, convenient and inexpensive accessory, which will contribute materially to the comfort of motorists, and which may be readily removed during the cooler seasons or at any time when it is not needed.

In the accompanying drawings Fig. 1 is a perspective view of a device embodying my invention, Fig. 2 is a side view of the same, and Fig. 3 is a partial front view thereof.

In the illustrated embodiment of my invention I provide a rigid rectangular frame comprising rectilinear upper and lower members 4 and 5, and slightly curved side-members 6, said members being of suitable material and fixedly connected with each other at the corners of the frame. Elongated slots 7 extend vertically through the upper and lower frame-members, and similar slots 8 extend laterally through the side-members. The rear side of the frame has secured thereon an imperforate covering 9 which may be of wood-veneer or sheet-metal. On the front side of the frame there is a covering 10 of coarse, open, strong fabric, preferably woven strips of cane, such as are used for chair-seats. Metal bars 11 are secured to the rear edges of the side-pieces of the frame, near the lower ends thereof, said bars extending downwardly from the frame and being turned forwardly to form parts 12 extending nearly at right angles to the upper portions.

When the device is in use it is arranged as indicated in Fig. 1, with the frame resting against the back-cushion of the automobile seat, the bar-portions 11 extending down behind the rear edge of the seat-cushion, and the parts 12 extending forward beneath said cushion. Thus, while the device is securely retained in position, it may be readily removed or replaced, when desired, by merely lifting the bottom seat-cushion. The length of the bar-portions 11 is preferably somewhat greater than the depth of the seat-cushion, so that the lower frame-member 5 will be slightly above the upper surface of the cushion, and in the initial construction of the device the metal bars are preferably made straight, being subsequently bent to correspond with the depth of the seat-cushion with which the device is used. The concavo-convex form of the frame is such as to conform substantially with the usual form of the back-cushion of the seat, and any slight difference in the configuration is readily accommodated by yielding of the cushion. The metal bars which hold the frame in place may be sufficiently flexible to permit some movement of the frame backwardly and forwardly, thus giving to the occupant of the seat the benefit of any yielding of the back-cushion. The "cane" covering of the frame is sufficiently yieldable to provide a comfortable conformation with the back of the person in the seat, and, obviously, a free circulation of air may occur through the perforate covering and the lateral openings 7 and 8 of the frame-members. The imperforate rear covering 9 effectually prevents bulging of the back-cushion into the space within the frame, which would obstruct the free circulation of air and defeat the main purpose of the device. Thus the device may be of minimum thickness and yet effectually perform the purpose of ventilating and preventing perspiration upon the back of the driver, with its resultant discomfort and soiling of the clothing.

Now, having described my invention, what I claim and desire to secure by Letters Patent is:

A detachable ventilating back-rest for automobile seats, comprising a substantially rectangular frame, a substantially rigid continuous imperforate covering upon one side of the frame, a yieldable perforate covering upon the other side of the frame, there being openings extending through the frame-members parallel with said coverings, and slightly flexible supporting bars extending from one edge of the frame and having portions at the ends thereof extending approximately perpendicular thereto, whereby said supporting bars may extend down behind the rear edge of a seat-cushion and beneath the body thereof to detachably and yieldingly support the frame against the back-cushion of the seat.

WM. G. WISLICEN.